United States Patent [19]

Street

[11] Patent Number: 5,347,137
[45] Date of Patent: Sep. 13, 1994

[54] MULTI LENS FOR EFFICIENT COLLECTION OF LIGHT AT VARYING DISTANCES

[75] Inventor: Graham S. B. Street, Reading, United Kingdom

[73] Assignee: Imatronic Limited, Berkshire, United Kingdom

[21] Appl. No.: 856,959

[22] Filed: Jul. 8, 1992

[30] Foreign Application Priority Data

Sep. 17, 1990 [GB] United Kingdom ............... 9020285

[51] Int. Cl.$^5$ ............................................. G01N 21/86
[52] U.S. Cl. ...................................... 250/561; 250/216
[58] Field of Search ................ 250/561, 216, 208.6; 356/5, 4, 1

[56] References Cited

U.S. PATENT DOCUMENTS

| | | | |
|---|---|---|---|
| 4,829,172 | 5/1989 | Miller | 356/5 |
| 4,882,478 | 11/1989 | Hayashi et al. | 250/208.6 |
| 4,937,611 | 6/1990 | Miyazaki | 250/208.6 |

FOREIGN PATENT DOCUMENTS

| | | |
|---|---|---|
| 0384353 | 2/1990 | European Pat. Off. . |
| 2122835 | 6/1983 | United Kingdom . |

*Primary Examiner*—David C. Nelms

[57] ABSTRACT

Optical distance measuring apparatus has a focusing lens (16) directing light reflected from a target toward a detector (18). The lens has discrete or continuous zones each associated with a target distance. The area of the lens zones increases with an increase in associated target distance so as to compensate for a reduction in intensity according to the inverse square law.

9 Claims, 4 Drawing Sheets

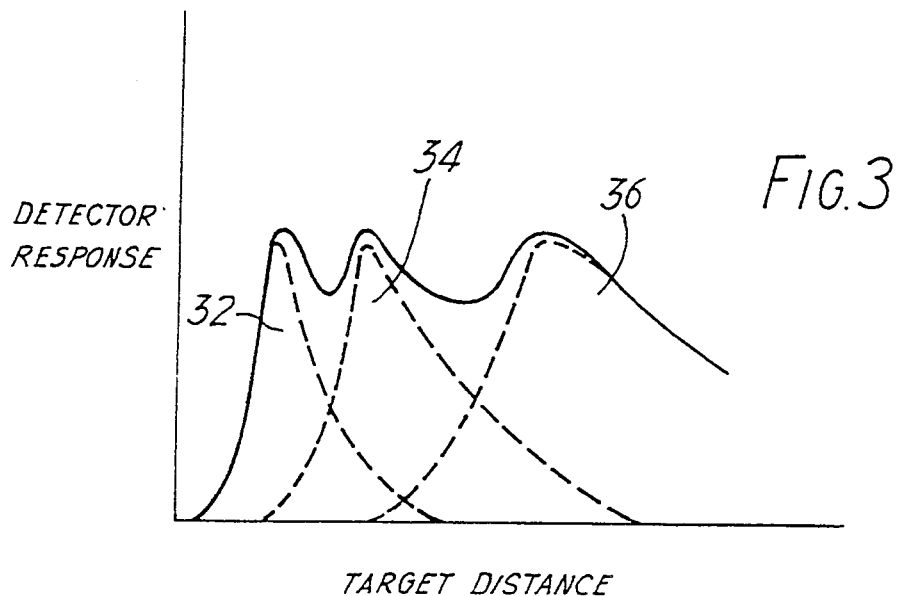
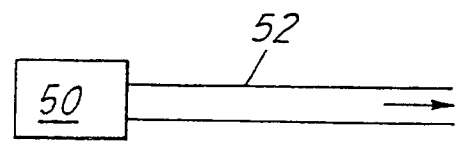
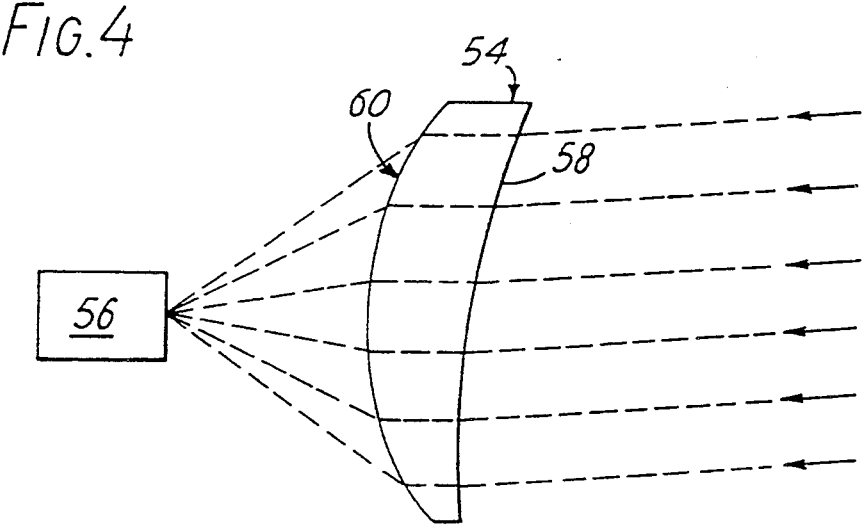

MULTI LENS FOR EFFICIENT COLLECTION OF LIGHT AT VARYING DISTANCES

FIELD OF THE INVENTION

This invention relates to optical apparatus and in particular to arrangements for the efficient collection of light reflected from a target at varying distances. The invention finds particular application with laser-based measuring devices utilising reflection to gauge a target distance.

BACKGROUND OF THE INVENTION

The efficient collection of light transmitted in a beam and reflected back from a target, is easy to achieve if the distance to the target is known and constant. If the target distance varies, two main difficulties result.

First, one focusing lens may no longer be adequate to focus light onto the detector over the working distance range of the optical apparatus. A possible solution to this problem is to allow the user of the apparatus to estimate the target distance, to choose from a number of interchangeable lenses, and to insert the chosen lens into the apparatus. This solution allows proper focusing onto the detector but is clumsy for the user. One object of this invention is to reduce the effort required from the user without reducing the range of the apparatus.

Second, the intensity of the light focused onto the detector must normally lie within certain levels if the detector is to function correctly. With a very distant target, the intensity of reflected light is low and the detector may not respond. Conversely, if the target is extremely close, the intensity of the reflected light may be so high as to saturate the detector. Previously, this problem has been overcome by allowing the user to choose from a variety of interchangeable filters, one of which is then placed in the path of the received light. The sensitivity of the detector is selected to give the required maximum range and the filters are used to attenuate light from closer targets. A further object of this invention is to avoid the complications and inconvenience of interchangeable filters.

SUMMARY OF THE INVENTION

Accordingly, the present invention consists in optical apparatus comprising a light beam source; light detector means and convergent optical means for directing light returned from a target onto the detector means, characterised in that the convergent optical means comprises a plurality of zonal elements each having an associated target distance at which returned light is directed optimally onto the detector means, the light gathering capability of the respective elements varying as between the elements with an increase in associated target distance so as to compensate for the reduction in the intensity of reflected light as a function of said distance.

Preferably, the light gathering capability of the respective zonal elements increases by virtue of an increase in the associated elemental area.

Advantageously, the zonal elements comprise respective refractive surface zones.

Suitably, the refractive surface zones are disposed concentrically of the light beam axis.

In one form of the invention, the zonal elements comprise respective zones of a first refractive surface, the convergent optical means including a second refractive surface, the first and second refractive surfaces being rotationally symmetric about respective, mutually spaced axis.

BRIEF DESCRIPTION OF THE DRAWINGS

The invention will now be described by way of examples with reference to the accompanying drawings in which:

FIG. 3 is a response curve illustrating the operation of the present invention;

FIG. 4 is a schematic diagram of distance measuring apparatus in a different embodiment of this invention;

DETAILED DESCRIPTION

There are a wide variety of published techniques for the measurement of distance by detecting light from a modulated beam which is reflected from a distant target. A focusing lens or other convergent optical means will typically be provided to direct the reflected light onto a single optical detector. This invention is particularly concerned with the detail of the optical convergent means and, in the following specific description, attention will be concentrated on this aspect of the apparatus. A detailed description will not be given of other aspects of the apparatus since these may be of conventional form and can be readily ascertained by the skilled man from the published literature.

Figure 1:
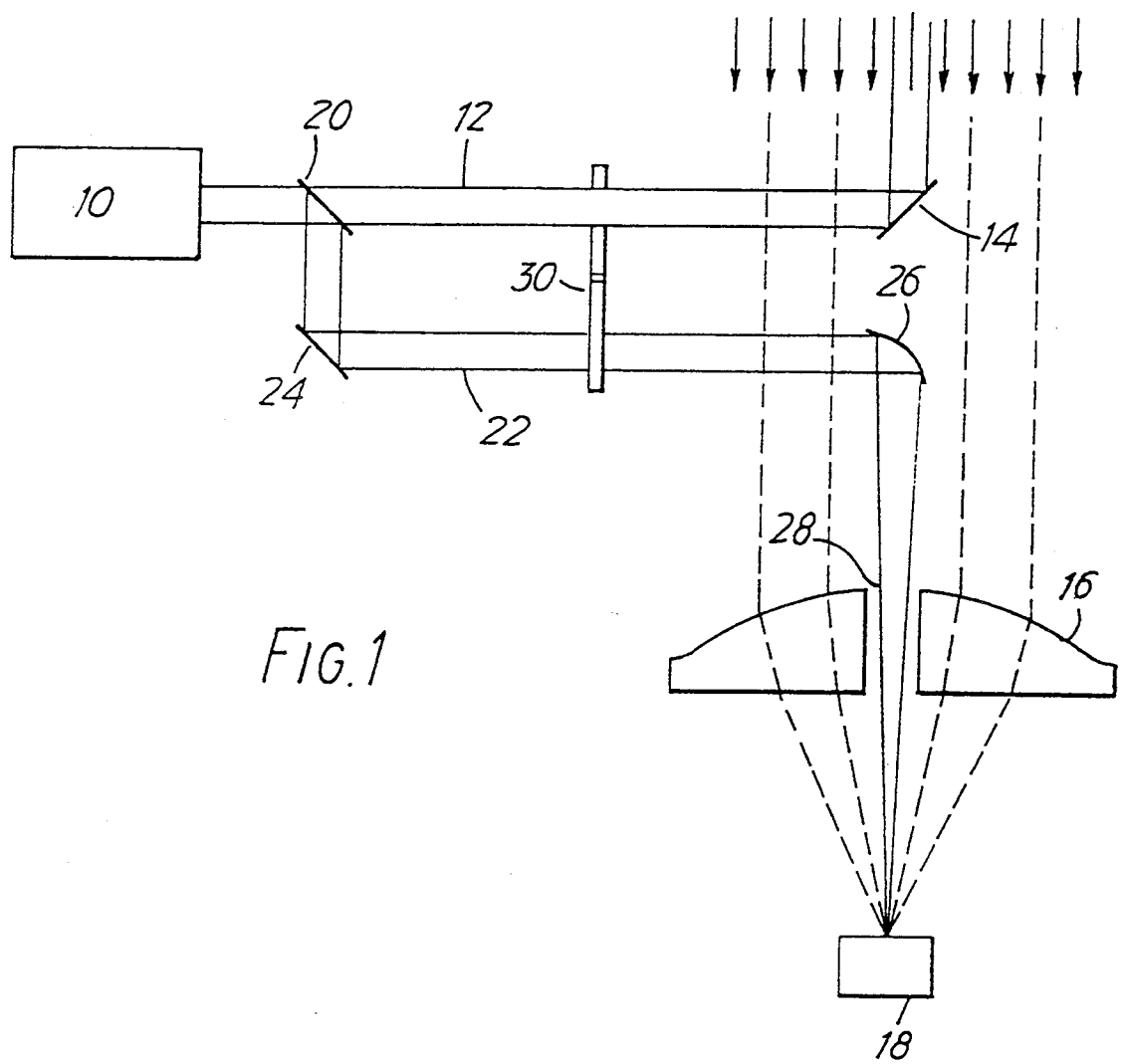
FIG. 1 is a schematic diagram of laser based distance measuring apparatus incorporating the present invention.

Referring now to FIG. 1, distance measuring apparatus comprises a collimated light beam source 10 producing a beam 12 which is directed by a mirror 14 towards a target (not shown). A lens 16 is positioned co-axially with the outgoing light beam and serves to focus light reflected from the target onto a detector 18.

A beam splitter 20 in the path of the light beam 12 directs a calibration beam 22 by mirrors 24 and 26 onto the axis of the lens 16. A central aperture 28 in the lens allows the calibration beam to pass directly to the detector 18. A chopper illustrated schematically in the form of a rotating disc 30 serves to break, alternately, the main beam and the calibration beam.

In a manner which may be entirely conventional, the amplitude of the light beam 12 is modulated and a distance measurement made by comparing the phase of the modulation in the incident and reflected beams. By performing the same phase comparison for the calibration beam 22, which of course travels over a known distance, an absolute measure of the distance to the target can be achieved.

Figure 2:
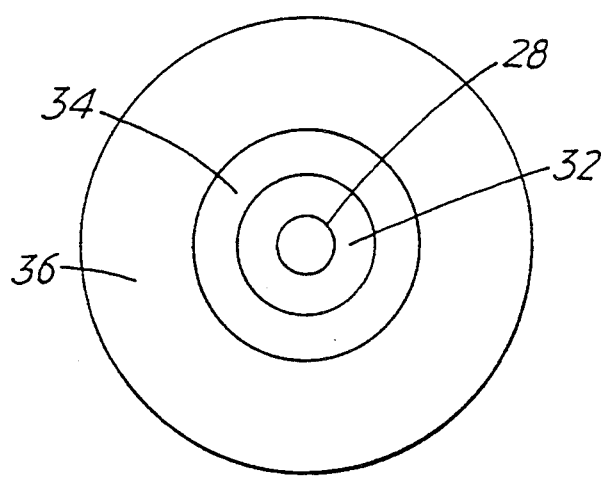
FIG. 2 is a plan view of the focusing lens shown in FIG. 1.

In accordance with the present invention, the lens 16 is provided with zonal elements, each associated with a particular target distance. As shown in FIG. 2, the zonal elements 32, 34 and 36 are annular and are concentric with the axis of the lens and thus with the axis of the transmitted light beam. Each zonal element has a different focal length so as to focus, optimally, light reflected from an associated target distance which is different from the target distances associated with the other zonal elements. Of course, each zonal element will focus some light onto the detector for target distances which are away from the associated distance at which focusing is optimal. Thus, for a particular target distance, there may be contributions from two or more zonal elements.

In accordance with this invention, the effective areas of the respective zonal elements are chosen so as to compensate for the decrease in the intensity of reflected light at increasing target distances. Thus, the annular zonal element 32 corresponding with the closest target distance is relatively small whilst the area of the annular zone 36 corresponding with the most distant, is relatively large. The intensity of the reflected light will vary according to the inverse square law and it will be recognised that the areas of the zonal elements can be chosen so as to produce a sensibly constant intensity of light at the detector, irrespective of variations in target distance, within of course the working range.

There is shown in FIG. 3, a response curve showing the detected light intensity at varying target distances. Within the response curve, contributions can be identified from each of the zonal elements and these are depicted in dotted outline. The composite response curve has variations but these lie within the sensitivity levels of the detector, over a considerable range in target distance.

It will be understood that the compensation which is provided for the variation in intensity over differing target distances, will be designed to meet the characteristics of a particular detector system. In many cases, the compensation will be partial in that the detector system will tolerate small variations in intensity. In appropriate cases, the compensation will produce a detected intensity which is not constant but which has a desired variation with distance.

Whilst the zonal elements have been described as discrete annular zones, each having a characteristic focal length, the invention encompasses an arrangement in which the zonal elements blend continuously one into another. The refractive surface of the lens can be mapped numerically so as to produce the desired characteristic. Thus, the light gathering capability of each zonal element—whether discrete or notional—will increase with an increase in associated target distance.

The preferred method for varying the light gathering capability of the zonal elements is, as described, to vary the effective area or optical aperture of the element. There are alternatives, however. In one example, zonal elements of equal area are coated with attenuating layers of differing transmissivity. This approach does have the drawback that the efficiency of light collection is reduced.

In the above described arrangement, the detector and the focusing lens are disposed coaxially with the outgoing light beam. Whilst this offers geometric simplicity, the dead zone around the axis of the focusing lens may be a disadvantage. An alternative arrangement will now be described in which the light detector and associated focusing lens are off the axis of the outgoing light beam.

Referring to FIG. 4, a collimated light beam source 50 produces a light beam 52 which is directed towards a remote target (not shown). Light reflected from the target is collected by convergent optical means 54 and directed to a detector 56. A suitable arrangement may be provided for providing a calibration path directly from the light beam source 50 to the convergent optical means 54. The procedures by which a distance measurement is produced from the output of the detector 56 will be analogous to those discussed above.

Figure 5:
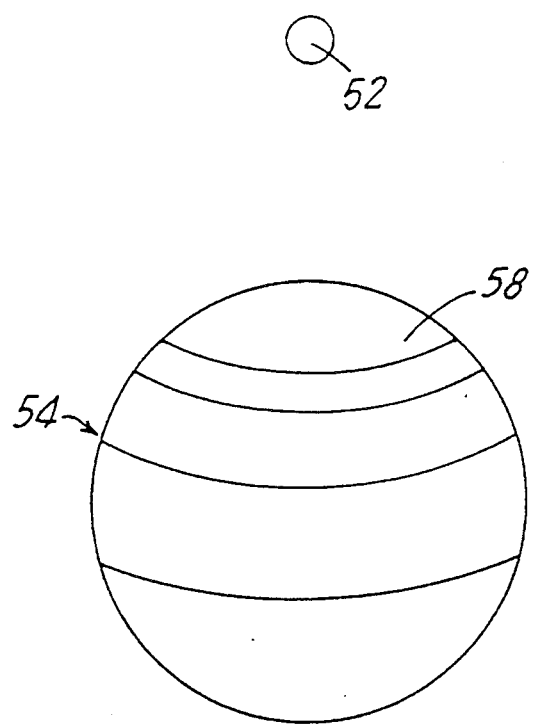
FIG. 5 is the plan view of a focusing lens shown in FIG. 4.
Figure 6:
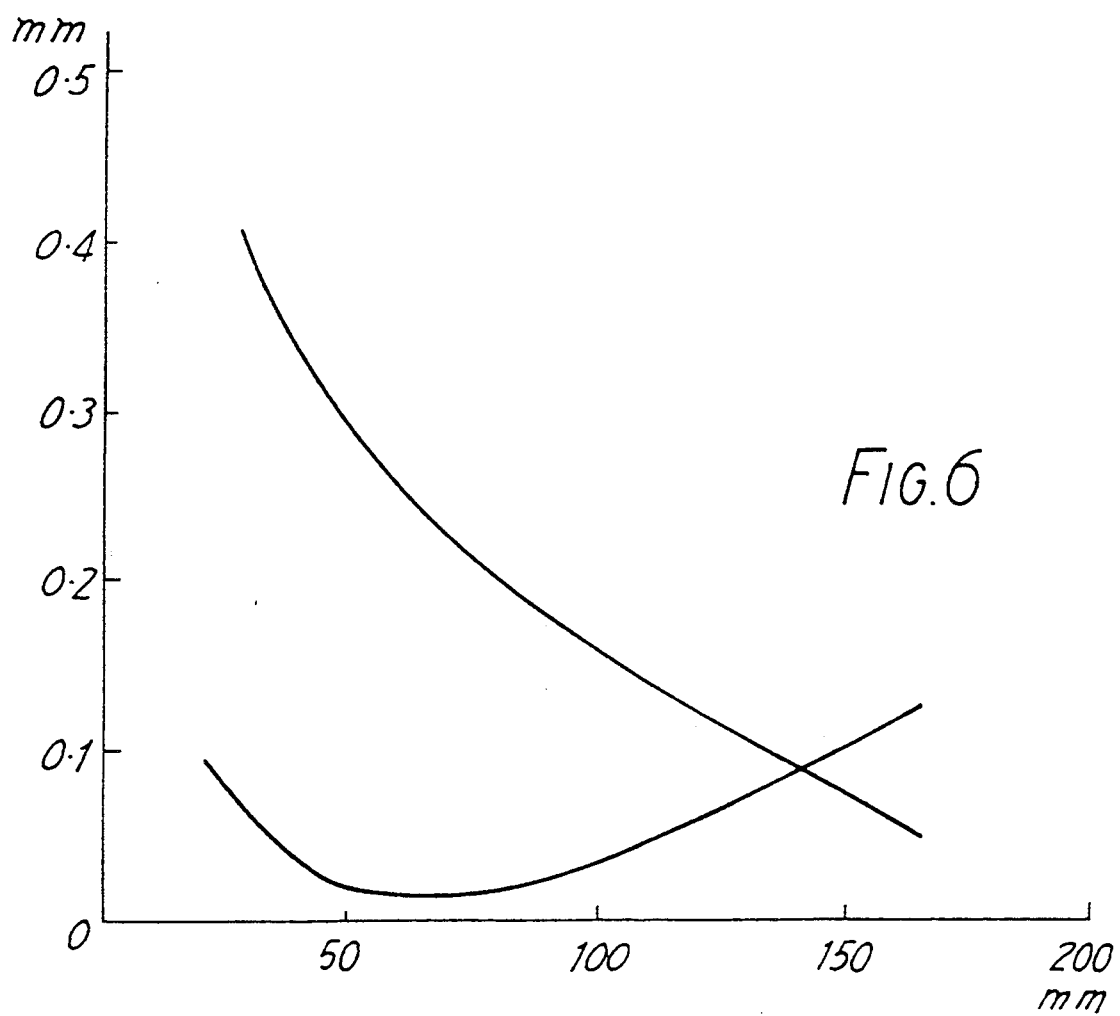
FIG. 6 is a graph illustrating the contour of the refractive surface shown in FIG. 5.

The convergent optical means 54 has front and back refracting surfaces 58 and 60. Back surface 60 is a hyperbole of revolution, and images any collimated light travelling parallel to its axis onto the detector 56. The front surface 58 comprises surface zones each designed to collimate light arriving, off axis, from an associated target distance. As shown in FIG. 5, the surface 58 is part of a rotationally symmetric surface having its axis of symmetry coaxial with the light beam 52. Each zone is associated with a particular target distance and light reflected from that target distance will be collimated, optimally, by the zone. The surface zones of the front refracting surface 58 are thus analogous with the described zones of the focusing lens in the first described embodiment. Again, as a practical matter, the zones may (and preferably will) blend continuously one into another and the contour of the front surface will be generated numerically. One example of a numerical solution is shown in FIG. 6. In this graph, at plot A, the deviation of the front surface 58 from a plane surface is plotted against the zone diameter, this diameter being measured from the axis of the light beam 52.

Whilst, for any target distance, the light collimated by the front surface 58—and thus focused by the back surface 60—will have contributions from many parts of the front surface, there can be identified zonal elements having an associated target distance at which light is directed optimally at the detector. The required light gathering capability at that target distance can be readily calculated from the inverse square law. This provides a relative value for the effective area of that element enabling a shape for the front surface to be computed. To a first approximation this surface may be a cone centered on the axis of the outgoing light beam. Deviations from the conical surface provide the necessary correction. The graph which is FIG. 6 shows—at plot B—the deviations from a conical surface for the same numerical solution.

It may be found that the design of a single optical element having a front, "correcting" surface rotationally symmetric about the beam axis and a second, "focusing" surface rotationally symmetric about the axis of the element, is difficult if problems of coma are to be avoided. It is therefore proposed, in a further embodiment of this invention, to provide the first and second refractive surfaces on different optical elements.

Figure 7:
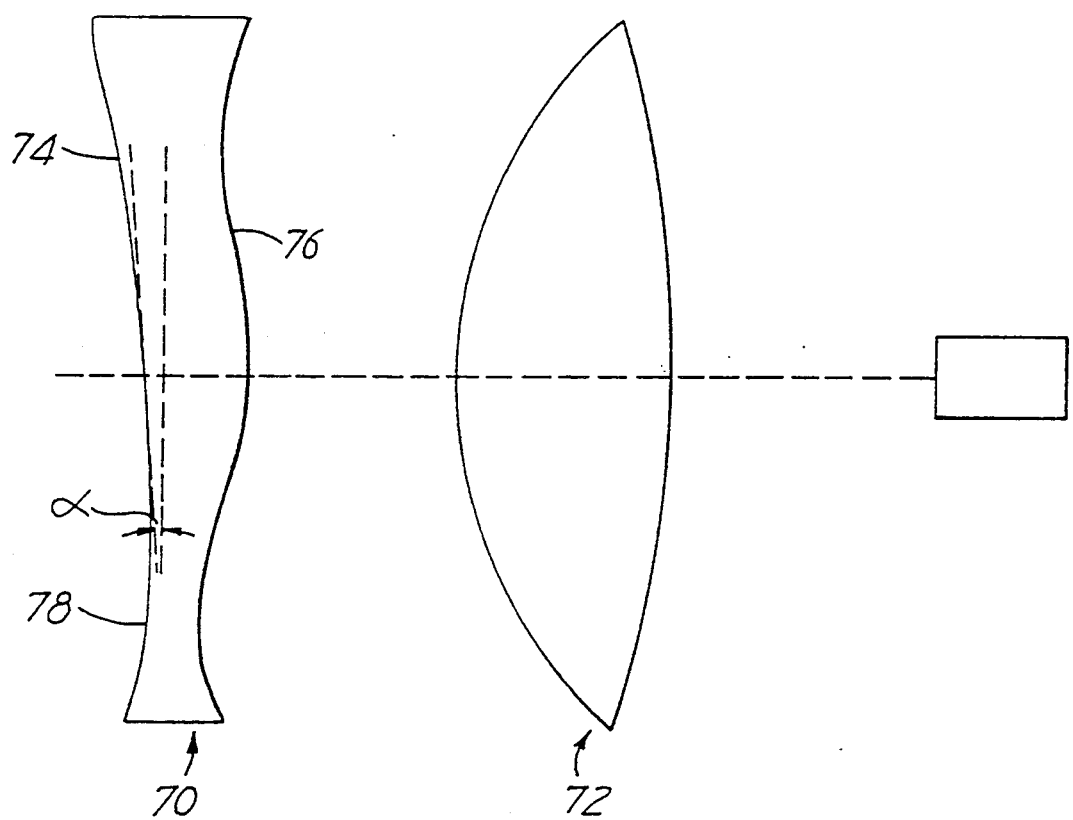
FIG. 7 illustrates schematically a modification of the apparatus of FIG. 4.

Turning to FIG. 7, there is shown an arrangement in which the convergent optical means 54 is replaced by a correcting optical element 70 and a main focusing lens 72. The correcting element 70 may be formed of plastics material and can conveniently serve as the window of a measuring device. The front surface 74 of the correcting element is rotationally symmetric about the beam axis shown at 74 and serves, as described above, to collimate off axis light. The surface is approximately conical with an angle of typically a few milliradians and in this example between 2 and 8 milliradians. Blended zones of appropriate area in the surface 74 are associated with respective target distances. The focusing lens 72, without the design constraints imposed by the correction surface, can be designed to give low coma. Conveniently, the rear surface 76 of the correcting element 70 can be configured to correct spherical distortion of the main focusing element 72, in a Schmidt arrangement.

It is preferred that, as in the described embodiments, the zonal elements associated with the shortest target distances are disposed closest to the axis of the outgoing beam. This optimises the depth of field.

Temperature effects may become significant in certain high accuracy applications of the present invention. A decrease in temperature will, for example, shorten the focal length of an acrylic lens. In one form of the present invention, the zonal elements are so designed that as temperature changes, different zonal elements become associated with a particular target distance. The design is such that, within tolerances, the required compensation of intensity is maintained. If appropriate, a deliberate curl such as that shown at 78 in FIG. 7 can be introduced into the correcting surface to compensate for temperature effects.

Whilst it is preferred to have the zonal elements in a single refracting surface, in appropriate circumstances, the elements may be divided. Moreover, the zonal elements can be formed in the convergent optical means otherwise than as part of a refracting surface. In one alternative, the zonal elements comprise respective regions of a reflective surface such as a parabolic mirror.

For ease of computation and manufacture, it is preferred that the zonal elements be rotationally symmetric about the axis of the outgoing light beam. The skilled man will appreciate, however, that this is not an essential requirement and that more general solutions exist which satisfy the requirement of varying the effective area of each zonal element in accordance with changes in the associated target range.

The convergent optical means will often focus light at the detector but in appropriate cases will merely direct light to the detector.

It should be understood that this invention has been described by way of examples only and a wide variety of further modifications can be made without departing from the scope of the invention as set out in the accompanying claims.

I claim:

1. Optical apparatus comprising a light beam source; light detector means and convergent optical means for directing light returned from a target onto the detector means, characterised in that the convergent optical means comprises a plurality of zonal elements each having an associated target distance at which returned light is directed optimally onto the detector means, the light gathering capability of the respective elements varying as between the elements with an increase in associated target distance so as to compensate for the reduction in the intensity of reflected light as a function of said distance.

2. Apparatus according to claim 1, wherein the light gathering capability of the respective zonal elements increases by virtue of an increase in the associated elemental area.

3. Apparatus according to claim 1, wherein the zonal elements comprise respective refractive surface zones.

4. Apparatus according to claim 3, wherein the light beam source is adapted to produce a beam along a first axis and wherein the refractive surface zones are disposed concentrically of the first axis.

5. Apparatus according to claim 3, wherein the refractive surface zones are disposed in a common refractive surface.

6. Apparatus according to claim 5, wherein the surface zones blend continuously one into another.

7. Apparatus according to any one of the preceding claims, wherein the light beam source is adapted to produce a light beam along a first axis and wherein the zonal elements comprise respective zones of a first refractive surface, the converging optical means including a second refractive surface, the first refractive surface being rotationally symmetric about said first axis and said second refractive surface being rotationally symmetric about a second axis parallel to and spaced from said first axis.

8. Apparatus according to claim 7, wherein the first refractive surface is provided in a correcting optical element serving to collimate light returned from varying target distances and the second refractive surface is provided in a lens focusing collimated light onto the light detector means.

9. Apparatus according to claim 8, wherein the correcting optical element further comprises a Schmidt correction surface.

* * * * *